Patented Jan. 12, 1943

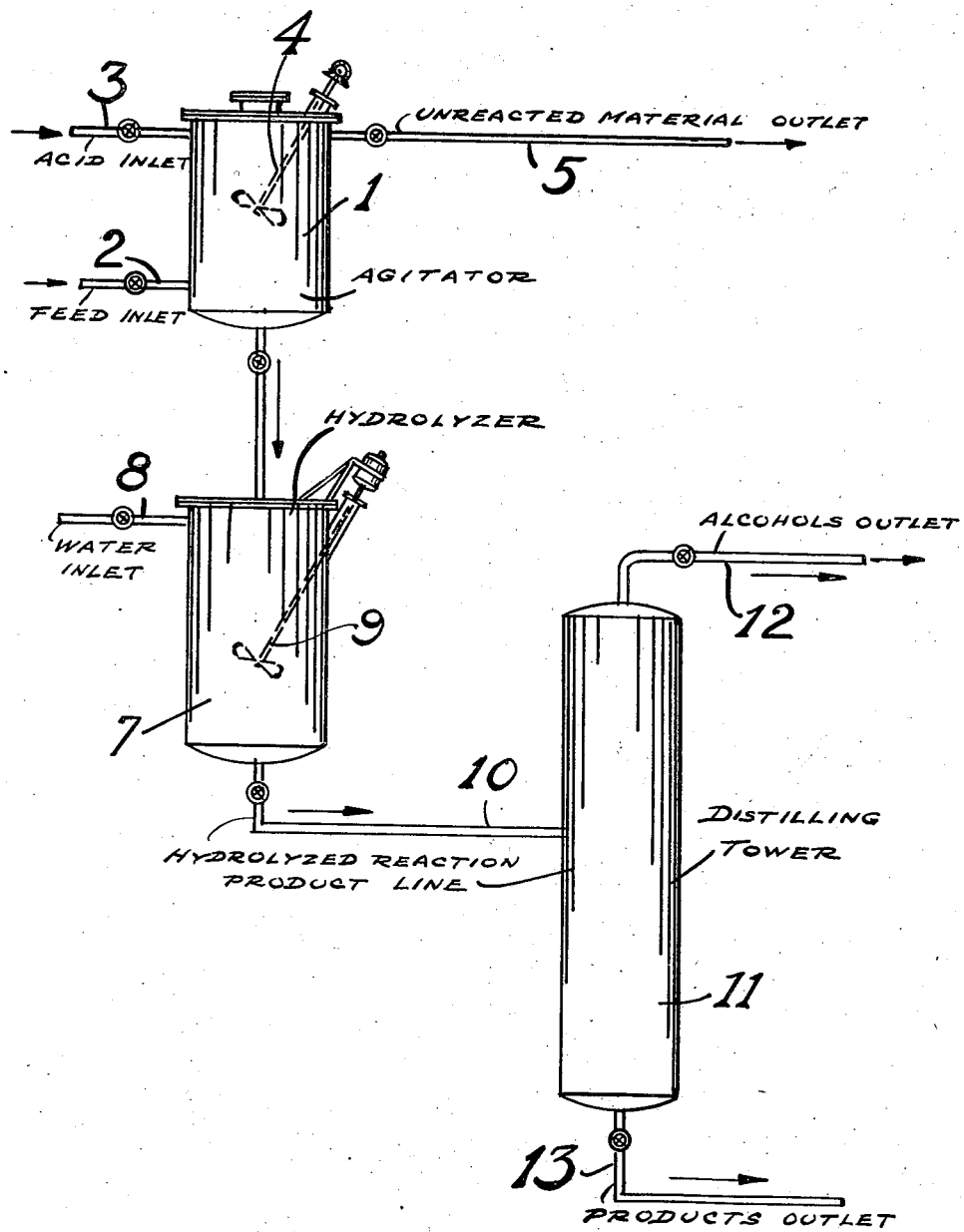

2,308,219

UNITED STATES PATENT OFFICE 2,308,219

PRODUCTION OF ALCOHOLS

Hans G. Vesterdal and Stewart C. Fulton, Elizabeth, N. J., assignors to Standard Alcohol Company Application January 7, 1938, Serial No. 183,767

2 Claims. (Cl. 260—639)

The present invention is concerned with high molecular weight alcohols and a process of manufacturing said alcohols from unsaturated hydrocarbons. The invention relates to the process of manufacturing these high molecular weight alcohols from olefin-containing hydrocarbon mixtures by treating said hydrocarbon mixtures with a strong polybasic mineral acid under conditions to form mono and dialkyl derivatives of the mineral acid, followed by hydrolyzing the alkyl derivatives to form alcohols. The invention is particularly concerned with alcohols of more than 6 carbon atoms which are prepared by treating olefin-containing hydrocarbons with fuming sulphuric acid in a manner whereby the yield of alcohols is substantially increased and the polymer formation greatly diminished. The invention also relates to increasing the speed of reaction in the manufacture of higher alcohols whereby higher olefins may be treated in a continuous system for a very short period of time, thus greatly increasing the capacity of manufacturing equipment.

It is known to treat unsaturated hydrocarbons, such as ethylene, propylene and the like, with sulphuric acid to form the corresponding esters and then to hydrolyze said esters by means of water and distill off the alcohols formed. In this process it is desirable to accelerate the action thereby increasing the capacity of the treating equipment by treating with relatively strong or fuming sulphuric acid. This, however, has a disadvantage in that it greatly increases the amount of undesirable polymer formation with the resulting decrease in yields of alcohols. These undesirable polymerizing conditions in the manufacture of higher alcohols as, for example, in the manufacture of alcohols having from 6 to 30 carbon atoms in the molecule, are greatly aggravated. Thus even in the manufacture of higher alcohols with relatively weak or concentrated sulphuric acid the polymer formation is excessive, due to the necessity of an appreciable time of contact, and the yield of alcohols relatively small. Heretofore stronger acids could not be used in the manufacture of higher alcohols since undesired polymer products were prohibitively increased and other side reactions occurred producing other undesirable materials as, for example, derivatives of carbyl sulfate.

The applicants, however, have invented a procesess whereby the use of fuming sulphuric acid is made possible and the reaction conducted in such a manner that the yield of alcohols is unexpectedly increased, the yield of the undesirable polymers greatly diminished, and side reactions minimized. The applicant's process comprises treating suitable feed materials with fuming sulphuric acid or its equivalent at relatively low temperatures or by treating these materials at somewhat higher temperatures for a relatively short time of contact with the fuming sulphuric acid.

The invention will be clearly understood by referring to the drawing, which shows a flow plan illustrating one modification of the invention. This process flow plan, given for purposes of illustration, relates to the manufacture of hexyl alcohol from hexenes. In this process a raw liquid fraction, known in the petroleum industry as a hexane cut containing hexenes which have been segregated with suitable distilling equipment from petroleum cracking and refining operations, is fed into agitator 1 by means of feed line 2. In agitator 1 this feed material contacts and is thoroughly mixed with fuming sulphuric acid led into the agitator through line 3. Stirrer 4 insures intimate mixture of the raw feed material and the fuming sulphuric acid. The unreacted materials of the hexane cut are removed from agitator 1 by means of line 5 and are suitably treated and handled in any manner desired. The acid hydrocarbon reaction liquor of agitator 1 is withdrawn by means of line 6 and introduced into hydrolyzer 7 where it is thoroughly mixed with water which is introduced by line 8. Stirrer 9 insures adequate mixing of the water and acid liquor. The hydrolyzed reaction product from agitator 7 comprising hexyl alcohol, sulphuric acid and water, is removed by line 10 and introduced into distilling tower 11 in which the alcohols are separated from the other products by distillation and taken overhead and removed through line 12. The spent acid, water and waste products are removed through line 13.

Suitable feed materials may be any unsaturated hydrocarbon or mixtures of unsaturated hydrocarbons. These materials may be contained in other inert materials as, for example, other hydrocarbons which are not reactive with fuming sulphuric acid. It is preferred to use petroleum fractions in which the reactive unsaturated hydrocarbons have from 6 to 18 carbon atoms in the molecule.

The acid used is preferably fuming sulphuric acid which contains from 10 to 65% free sulphur trioxide, preferably acid containing from 30 to 40% free sulphur trioxide. Other similar strong sulfating agents as, for example, chlorsulfonic acid and phosphoric acid, containing free phosphoric oxide, may also be used.

The relative feed rates may be adjusted to secure optimum yields and vary with the strength of the acid used and vary also with the particular feed stock being utilized.

It is preferred to contact the sulphuric acid and the olefins at temperatures in the range from about −15° to 15° F., preferably at temperatures below 0° F. It is very desirable to remove the acid olefin reaction products from the excess fuming sulphuric acid before allowing the temperature to rise. It is preferred to reduce the strength of the excess sulphuric acid to below about 60% concentration.

Somewhat higher temperatures may be used as, for example, temperatures from 50 to 70° F., providing the time of contact between the olefins and the fuming sulphuric acid is reduced accordingly. For example, under these conditions, when using fuming sulphuric acid containing 20% free sulphur trioxide, the time of contact should be less than about 3 minutes, and when using sulphuric acid containing 40 to 65% free sulphur trioxide, the time of contact should be less than 1 minute. The pressure employed in the manufacture of these higher alcohols is preferably atmospheric although higher pressures may also be used.

The following examples are given for purposes of illustration and are not to be construed as limiting the invention in any manner whatsoever.

Example 1

A distillate from a cracked Ranger petrolatum, which had a boiling point less than 350° F., was treated in the following manner: 680 parts by weight of this distillate, which contained approximately 70% olefins, was treated with sulphuric acid containing 40% free sulphur trioxide at a temperature of −10° F. This reaction mixture was then poured on ice to prevent polymerization upon dilution and was slowly hydrolyzed by distillation, resulting in a yield of 449 parts by weight. This product was then distilled and the following fractions secured:

| Fraction | Temperature range, °F. | Parts by weight of the distillate | Specific gravity |
|---|---|---|---|
| 1 | 95–212 | 223 | .675 |
| 2 | 212–257 | 92 | .74 |
| 3 | 257–365 | 91 | .77 |
| 4 | 365–446 | 43 | .81 |
| Total | | 449 | |

Example 2

Approximately 340 parts by weight of hexylene was treated with 200 parts by weight of sulphuric acid containing 20% oleum at a temperature from −10 to 0° F. This material was then further treated with 200 parts by weight of sulphuric acid containing 65% free sulphur trioxide. The reaction mixture was treated as described in Example 1 and the resulting product was distilled. The yield of hexyl alcohol secured was approximately 54%.

Example 3

A hydrocarbon cut, known as a pentane-hexane fraction in refinery processes, was segregated by means of suitable distilling equipment. This pentane-hexane cut contained approximately 25% olefins. 100 volumes of this material was treated with 18 volumes of sulphuric acid containing 20% oleum at a temperature of from about 10 to 20° F. for approximately 320 seconds. The acid extract was separated from the unreacted material and was hydrolyzed by diluting it with ice water to an acid strength of about 10%. This material was then distilled for approximately 2 hours until the acid strength had reached about 30%. A yield of 12.8 volumes of amyl and hexyl alcohol was secured.

Alcohols were manufactured in accordance with a preceding process, except that 95% sulphuric acid was used and the resulting yield was only 8.2 volumes per 100 volumes of the pentane-hexane cut.

Example 4

A hydrocarbon fraction, known in refinery practice as a heptane cut and secured from cracked wax, was treated in the following manner: 100 volumes of the heptane cut was treated with 24 volumes of sulphuric acid containing 20% free sulphur trioxide in a continuous mixture at 60° F. for a time of contact of 110 seconds. The acid extract was then diluted to an acid strength of about 10% and was hydrolyzed by distilling for 2 hours. The resulting product was then distilled and the following yields were secured:

|  | Yield based on feed material |
|---|---|
| Heptyl alcohols, per cent | 34.5 |
| Polymers, do | 10.5 |
| Acid efficiency cc. alcohol/cc. acid used | 1.44 |

Alcohols were prepared by the process described above, except that 95% sulphuric acid at a temperature of 110–120° F. was employed. The time of contact was approximately 510 seconds. This material was then hydrolyzed and the resulting product distilled in the manner described. The yields were as follows:

|  | Yield based on feed material |
|---|---|
| Heptyl alcohols | 25.0 |
| Polymers | 16.6 |
| Acid efficiency cc. alcohol/cc. acid used | 0.53 |

Example 5

1,000 parts by weight of a cracked wax fraction boiling between 400 and 600° F. was treated with 180 parts by weight of sulphuric acid, containing 20% free sulphur trioxide, at a temperature from 10 to 15° F. in a batch agitator. This mixture was then neutralized with sodium hydroxide and the sodium alkyl sulfate was segregated by extraction with isopropyl alcohol. The yield of the sodium alkyl sulfate was approximately 400 parts by weight. This product was then hydrolyzed by refluxing in a 10% hydrochloric acid solution and followed by vacuum distillation of the alcohols. The resulting yield was 177 parts by weight of mixed alcohols containing from 10 to 18 carbon atoms in the molecule.

The process may be varied or altered within wide limits. For example, temperatures, pressures, acid strength, feed rates and any particular method of mixing or treating may be widely varied. The conditions are adapted to the particular olefins or to the particular mixture of olefins or to the olefin-containing fraction which are being treated in order to secure various products and optimum yields as, for example, to secure a maximum yield of heptyl alcohol from a heptane cut. It is desirable to separate the acid reaction products from the unreacted hydrocarbons before hydrolyzing the olefin acid reaction products. This is not, however, necessary and the entire fraction may be hydrolyzed and the alcohols thereafter separated from the unreacted hydrocarbons, spent acid, etc. by distillation.

The above invention is not to be limited by any theory or method of operation but only by the following claims in which it is desired to claim all novelty in so far as the prior art permits.

We claim:

1. In the process of making alcohol from olefines by esterifying the olefines with sulfuric acid and hydrolyzing the esters, the step of forming acid alkyl esters by contacting while agitating olefines containing from 6 to 18 carbon atoms in the molecule with sulfuric acid containing from 10% to 65% free sulfur trioxide under non-polymerizing temperature below 15° F. and time of contact not in excess of 110 seconds.

2. In the process of making alcohol from olefines by esterifying the olefines with sulfuric acid and hydrolyzing the esters, the step of forming acid alkyl esters by contacting olefines having from 6 to 30 carbon atoms in the molecule with fuming sulfuric acid in the presence of from 20 to 40% free sulfur trioxide at a temperature substantially between −10° and −20° F., the time of contact being less than about 320 seconds.

HANS G. VESTERDAL.
STEWART C. FULTON.